US010469819B2

(12) United States Patent
Wang et al.

(10) Patent No.: US 10,469,819 B2
(45) Date of Patent: Nov. 5, 2019

(54) AUGMENTED REALITY DISPLAY METHOD BASED ON A TRANSPARENT DISPLAY DEVICE AND AUGMENTED REALITY DISPLAY DEVICE

(71) Applicant: Shenzhen China Star Optoelectronics Semiconductor Display Technology Co., Ltd., Shenzhen, Guangdong (CN)

(72) Inventors: Limin Wang, Guangdong (CN); Ming-jong Jou, Guangdong (CN)

(73) Assignee: Shenzhen China Star Optoelectronics Semiconductor Display Technology Co., Ltd, Shenzhen, Guangdong (CN)

( * ) Notice: Subject to any disclaimer, the term of this patent is extended or adjusted under 35 U.S.C. 154(b) by 27 days.

(21) Appl. No.: 15/750,612

(22) PCT Filed: Sep. 1, 2017

(86) PCT No.: PCT/CN2017/100262
§ 371 (c)(1),
(2) Date: Feb. 6, 2018

(87) PCT Pub. No.: WO2019/033469
PCT Pub. Date: Feb. 21, 2019

(65) Prior Publication Data
US 2019/0058860 A1 Feb. 21, 2019

(30) Foreign Application Priority Data
Aug. 17, 2017 (CN) .......................... 2017 1 0707974

(51) Int. Cl.
*H04N 13/111* (2018.01)
*G06K 9/00* (2006.01)
(Continued)

(52) U.S. Cl.
CPC ......... *H04N 13/111* (2018.05); *G06K 9/0061* (2013.01); *G06K 9/00604* (2013.01);
(Continued)

(58) Field of Classification Search
CPC ....... H04N 13/111; G06T 7/70; G06K 9/0061
(Continued)

(56) References Cited

U.S. PATENT DOCUMENTS

2011/0140994 A1* 6/2011 Noma ................. G02B 27/017 345/8
2012/0050493 A1* 3/2012 Ernst .................. G02B 27/017 348/47
(Continued)

FOREIGN PATENT DOCUMENTS

CN 102402287 A 4/2012
CN 103472909 A 12/2013
(Continued)

*Primary Examiner* — Jin Ge
(74) *Attorney, Agent, or Firm* — Andrew C. Cheng (57) ABSTRACT

An augmented reality display method based on a transparent display device and a device are disclosed. The transparent display device is disposed between a user and an object. The method includes: determining a first three-dimensional coordinate location of a user viewpoint related to the transparent display device; determining a second three-dimensional coordinate location of the object related to the transparent display device; determining a position of the object on a viewing region of the transparent display device according to the first and the second three-dimensional coordinate locations; determining a displaying position of the auxiliary information of the object according to the position of the object; and controlling the device to display the auxiliary information of the object at the displaying position. Accord-
(Continued)

ingly, the technology problem that a vision of the user is blocked when displaying the auxiliary information of the object is avoided.

10 Claims, 4 Drawing Sheets

(51) Int. Cl.
*G06T 7/70* (2017.01)
*H04N 13/344* (2018.01)

(52) U.S. Cl.
CPC ............ *G06K 9/00671* (2013.01); *G06T 7/70* (2017.01); *H04N 13/344* (2018.05)

(58) Field of Classification Search
USPC ......................................................... 345/419
See application file for complete search history.

(56) References Cited

U.S. PATENT DOCUMENTS

| | | | |
|---|---|---|---|
| 2012/0072873 A1* | 3/2012 | Park | G06F 3/013 715/863 |
| 2012/0224060 A1* | 9/2012 | Gurevich | B60R 1/00 348/148 |
| 2013/0120330 A1* | 5/2013 | Kang | G09G 5/10 345/207 |
| 2014/0204023 A1* | 7/2014 | Kumar | G06K 9/00671 345/156 |
| 2015/0003819 A1* | 1/2015 | Ackerman | G02B 7/287 396/51 |
| 2015/0204687 A1* | 7/2015 | Yoon | G01C 21/3658 701/436 |
| 2015/0332505 A1* | 11/2015 | Wang | G06T 15/06 345/633 |
| 2016/0078680 A1* | 3/2016 | Reif | G06F 3/011 345/633 |
| 2016/0163108 A1* | 6/2016 | Kim | G02B 27/0101 345/633 |
| 2017/0147154 A1* | 5/2017 | Steiner | G06F 3/0481 |
| 2018/0089854 A1* | 3/2018 | Ahn | G06T 7/74 |

FOREIGN PATENT DOCUMENTS

| | | |
|---|---|---|
| CN | 103909875 A | 7/2014 |
| CN | 104272371 A | 1/2015 |
| CN | 106627369 A | 5/2017 |
| JP | 2005258015 A | 9/2005 |

\* cited by examiner

AUGMENTED REALITY DISPLAY METHOD BASED ON A TRANSPARENT DISPLAY DEVICE AND AUGMENTED REALITY DISPLAY DEVICE

BACKGROUND OF THE INVENTION

1. Field of the Invention

The present invention relates to an augmented reality field, and more particularly to an augmented reality display method based on a transparent display device and an augmented reality display device.

2. Description of Related Art

The augmented reality is a technology that can realize a combination of virtual and reality, and has obtained more and more attention. As a newly developed image technology and transparent electronic equipment, a transparent display device that can display an image and view an object at a back side of the transparent display device is actively researched such that an object can be viewed through the transparent display panel.

SUMMARY OF THE INVENTION

The embodiment of the present invention provides an augmented reality display method based on a transparent display device and an augmented reality display device in order to solve a technology problem that a vision of a user is easily to be blocked when displaying an auxiliary information of the object on the conventional transparent display device.

According to an aspect of the exemplary embodiment of the present invention, providing an augmented reality display method based on a transparent display device, the transparent display device is disposed between an user and an object, and the augmented reality display method comprises: determining a first three-dimensional coordinate location of a viewpoint of a user related to a transparent display device; recognizing the object in a field at the back side of the transparent display device, and obtaining an auxiliary information of the object; determining a second three-dimensional coordinate location of the object related to the transparent display device; determining a position of the object on a viewing region of the transparent display device according to the first three-dimensional coordinate location and the second three-dimensional coordinate location; wherein the viewing region is a region that viewing the object at the viewpoint of the user through the transparent display device; determining a displaying position of the auxiliary information of the object on the transparent display device according to the position of the object on the viewing region; and controlling the transparent display device to display the auxiliary information of the object at the displaying position.

Optionally, the step of determining a first three-dimensional coordinate location of a viewpoint of a user related to a transparent display device comprises: obtaining a face image of the user through a first camera unit disposed on a first surface of the transparent; recognizing the face image being obtained to determine a position of a human eye in the face image; determining the viewpoint of the user based on the position of the human eye in the face image; and using a preset position on the transparent display device as an origin of a reference coordinate system, determining a three-dimensional coordinate of the viewpoint of the user related to the origin of the reference coordinate system, and using the three-dimensional coordinate being determined as the first three-dimensional coordinate location.

Optionally, the step of recognizing the object in a field at the back side of the transparent display device comprises: obtaining a field image at the back side of the transparent display device through a second camera unit disposed at a second surface of the transparent display device, wherein the first surface and the second surface are two surfaces of the transparent display device that disposed oppositely; recognizing the field image being obtained, and determining the object in the field image; wherein the step of determining a second three-dimensional coordinate location of the object related to the transparent display device comprise a step of determining a three-dimensional coordinate of the object related to the origin of the reference coordinate system, and the three-dimensional coordinate being determined as the second three-dimensional coordinate location.

Optionally, the position of the first camera unit on the first surface of the transparent display device is opposite to the position of the second camera unit on the second surface of the transparent display device, and the present position is the position of the first camera unit on the first surface or the position of the second camera unit on the second surface.

Optionally, the method further comprises: performing an edge detection to the field image at the back side of the transparent display device being obtained, and recognizes an edge of the object, wherein the second three-dimensional coordinate location of the object includes three-dimensional coordinates of all points on the edge of the object related to the origin; wherein the step of determining a position of the object on a viewing region of the transparent display device according to the first three-dimensional coordinate location and the second three-dimensional coordinate location comprises: using a plane where the transparent display device is located as a reference plane, line connecting the first three-dimensional coordinate location of the viewpoint of the user and the three-dimensional coordinates of all points on the edge of the object to form multiple lines, and using a region on the transparent display device formed by all intersection points of the multiple lines and the reference plane as the position of the object on the viewing region.

Optionally, the step of determining a displaying position of the auxiliary information of the object on the transparent display device according to the position of the object on the viewing region comprises: determining a type of the auxiliary information of the object; and according to the type of the auxiliary information of the object, displaying the auxiliary information of the object at a peripheral of the position of the object on the viewing region or displaying the auxiliary information of the object to be overlapped with the position of the object on the viewing region.

Optionally, the method further comprises steps of: sensing an environment brightness value of an external environment; and when the environment brightness value of the external environment is greater, a display brightness of the auxiliary information is higher.

Optionally, the method further comprises steps of: sensing an environment brightness value of an external environment; determining the display brightness value corresponding to the environment brightness values being sensed according to a preset relationship between multiple environment brightness values and multiple display brightness values; regulating the display brightness of the auxiliary information of the object to the display brightness being determined.

According to another aspect of the exemplary embodiment of the present invention, providing an augmented reality display device, comprising: a transparent display device disposed between an user and an object; a first camera unit for obtaining a face image of the user; a second camera unit for obtaining a field image at a back side of the transparent display device; a processor being configured to perform step of: determining a viewpoint of the user based on the face image, and determining a first three-dimensional coordinate location of the viewpoint of the user related to the transparent display device; determining the object in the field image based on the field image being obtained, obtaining the auxiliary information of the object, and determining a second three-dimensional coordinate location of the object related to the transparent display device; determining a position of the object on a viewing region of the transparent display device according to the first three-dimensional coordinate location and the second three-dimensional coordinate location; determining a displaying position of the auxiliary information of the object on the transparent display device according to the position of the object on the viewing region, and controlling the transparent display device to display the auxiliary information of the object at the displaying position.

Optionally, the step of determining a first three-dimensional coordinate location of a viewpoint of a user related to a transparent display device comprises: recognizing the face image being obtained by the first camera unit to determine a position of a human eye in the face image, determining the viewpoint of the user based on the position of the human eye in the face image, and using a preset position on the transparent display device as an origin of a reference coordinate system, determining a three-dimensional coordinate of the viewpoint of the user related to the origin of the reference coordinate system, and using the three-dimensional coordinate being determined as the first three-dimensional coordinate location.

Optionally, the step of recognizing the object in a field at the back side of the transparent display device comprises: recognizing the field image being obtained, and determining the object in the field image; wherein the step of determining a second three-dimensional coordinate location of the object related to the transparent display device comprise a step of determining a three-dimensional coordinate of the object related to the origin of the reference coordinate system, and the three-dimensional coordinate being determined as the second three-dimensional coordinate location.

Optionally, the first camera unit is disposed on a first surface of the transparent display device, the second camera unit is disposed on a second surface of the transparent display device, and the first surface and the second surface are two opposite surfaces of the transparent display device; and a position of the first camera unit on the first surface of the transparent display device is opposite to a position of the second camera unit on the second surface of the transparent display device, and the present position is the position of the first camera unit on the first surface or the position of the second camera unit on the second surface.

Optionally, the processor performs an edge detection to the field image, recognizing an edge of the object, wherein the second three-dimensional coordinate location of the object includes three-dimensional coordinates of all points on the edge of the object related to the origin; wherein the step of determining a position of the object on a viewing region of the transparent display device according to the first three-dimensional coordinate location and the second three-dimensional coordinate location comprises: using a plane where the transparent display device is located as a reference plane, line connecting the first three-dimensional coordinate location of the viewpoint of the user and the three-dimensional coordinates of all points on the edge of the object to form multiple lines, and using a region on the transparent display device formed by all intersection points of the multiple lines and the reference plane as the position of the object on the viewing region.

Optionally, the step of determining a displaying position of the auxiliary information of the object on the transparent display device according to the position of the object on the viewing region comprises: determining a type of the auxiliary information of the object; and according to the type of the auxiliary information of the object, displaying the auxiliary information of the object at a peripheral of the position of the object on the viewing region or displaying the auxiliary information of the object to be overlapped with the position of the object on the viewing region.

Optionally, the augmented reality display device further comprises: an environment light sensing unit for sensing an environment brightness value of an external environment; and when the environment brightness value of the external environment is greater, a display brightness of the auxiliary information is higher.

Optionally, the augmented reality display device further comprises: an environment light sensing unit for sensing an environment brightness value of an external environment; wherein the processor determines the display brightness value corresponding to the environment brightness values being sensed according to a preset relationship between multiple environment brightness values and multiple display brightness values, and regulates the display brightness of the auxiliary information of the object to the display brightness being determined.

According to another aspect of the exemplary embodiment of the present invention, providing a computer readable storage media that stores with program instructions of the augmented reality display method based on the transparent display device as claimed in claim 1 and executed by a processor when the processor is operated.

The augmented reality display method based on a transparent display device and the augmented reality display device can effectively avoid the technology problem that a vision of a user is easily to be blocked when displaying an auxiliary information of the object on the conventional transparent display device.

DETAILED DESCRIPTION OF THE PREFERRED EMBODIMENT

The following content combines with the drawings and the embodiment for describing the present invention in detail. However, many other forms can be used to implement the present invention. Besides, the present invention should not be interpreted to be limit in the specific embodiment described here. On the contrary, the embodiments provided here can make the present publication to be thorough and complete, and the embodiments will fully communicate the scope of the present invention to the person skilled in the art.

Figure 1:
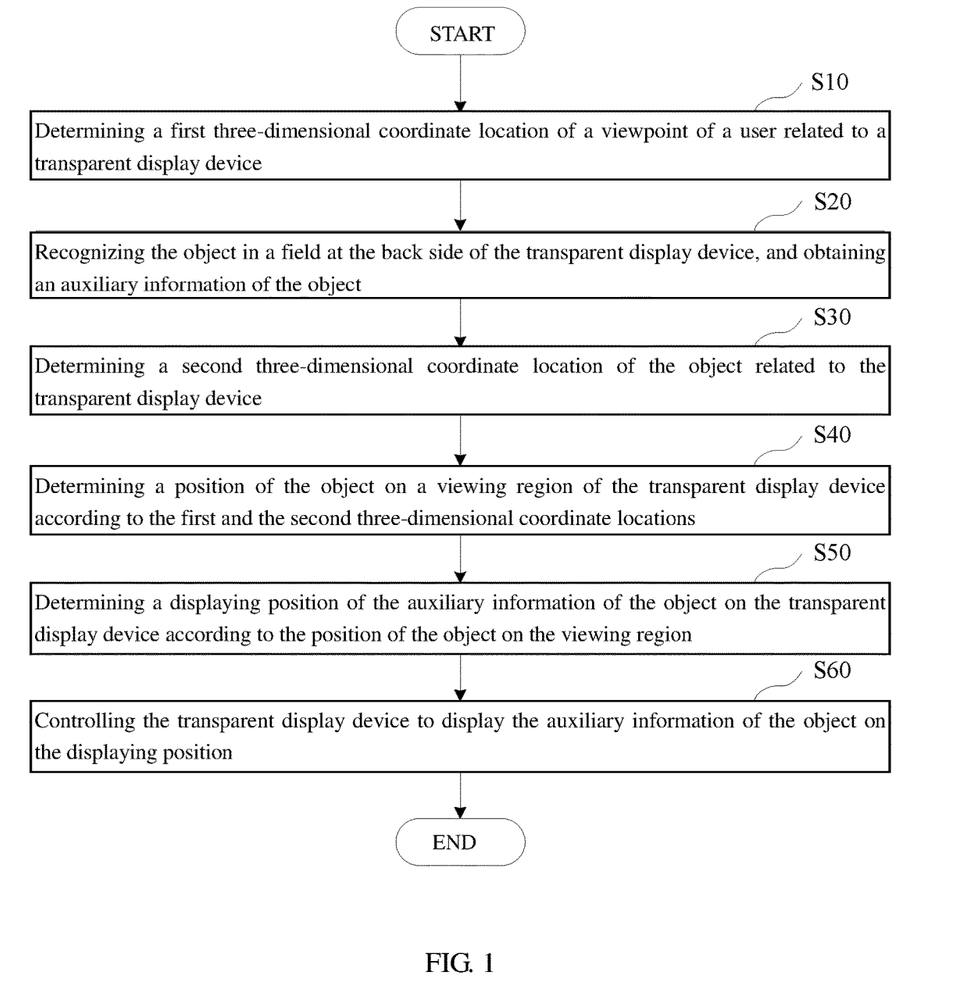
FIG. 1 is a flow chart of an augmented reality display method based on a transparent display device according to an embodiment of the present invention.

FIG. 1 shows a flow chart of augmented reality display method based on a transparent display device according to an embodiment of the present invention. Here, the transparent display device can be a conventional display device that can realize a transparent display function such as an AMOLED transparent display device or an LCD transparent display device. The transparent display device is disposed between a user and the object.

The following content will illustrate a process for determining a displaying position of an auxiliary information of an object on the transparent display device based on the position of the user and the object.

As shown in FIG. 1, in a step S10, determining a first three-dimensional coordinate location of a viewpoint of a user related to a transparent display device. It can be understood that here, the viewpoint of the user can be an observation point of the user for observing the object located at a back side of the transparent display device.

Figure 2:
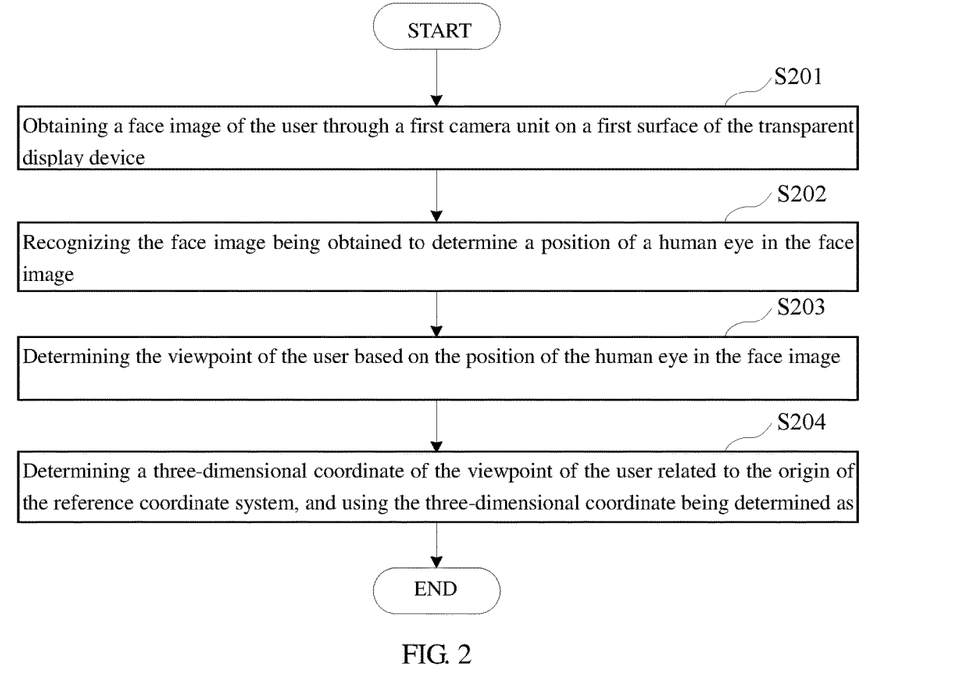
FIG. 2 is a flow chart of determining a first three-dimensional coordinate position of a viewpoint of a user related to a transparent display device according to an embodiment of the present invention.

FIG. 2 shows a flow chart of determining a first three-dimensional coordinate position of a viewpoint of a user related to a transparent display device according to an embodiment of the present invention.

With reference to FIG. 2, in a step S201, obtaining a face image of the user through a first camera unit on a first surface of the transparent display device.

In the step S202, recognizing the face image being obtained to determine a position of a human eye in the face image.

Here, the step of determining a position of a human eye in the face image based on the face image can adopt various methods in the conventional art. For example, edge detecting the face image of the user being obtained, and combining with feature information of every parts of a human face such as human eyes, nose, mouth, ears stored in advance to perform the edge detection in order to identify the human eye in the face image so as to determine the position of the human eye in the face image.

In the step S203, determining the viewpoint of the user based on the position of the human eye in the face image. Here, the step of determining the viewpoint of the user based on the position of the human eye in the face image can adopt various methods in the conventional art, no more repeating in the present invention.

In a step S204, using a preset position on the transparent display device as an origin of a reference coordinate system, determining a three-dimensional coordinate of the viewpoint of the user related to the origin of the reference coordinate system, and using the three-dimensional coordinate being determined as a first three-dimensional coordinate location.

Returning to FIG. 1, in the step S20, recognizing the object in a field at the back side of the transparent display device, and obtaining an auxiliary information of the object. It can be understood that a side of the transparent display device facing toward the user can be defined as a front side of the transparent display device, and a side of the transparent display device away from the user (that is, facing toward the object) is defined as the back side of the transparent display device.

Here, the object can be various biological and non-biological bodies in real life. For example, the object can include people, animals, vehicles, buildings, household items, natural plants, etc. The auxiliary information of the object can represent an information that describes the object.

For example, the auxiliary information of the object can include at least one of the following terms: the object name, the object type information, the object history information, the object performance parameter, the object appearance information, the object weight information, the object's position information and an image that includes a shape of the object.

Here, various methods can be adopted to obtain auxiliary information of the object. For example, the auxiliary information of the object can be stored in a local storage device or a server of the transparent display device in order to obtain the auxiliary information of the object in the local storage device or server.

In the step S30, determining a second three-dimensional coordinate location of the object related to the transparent display device.

Figure 3:
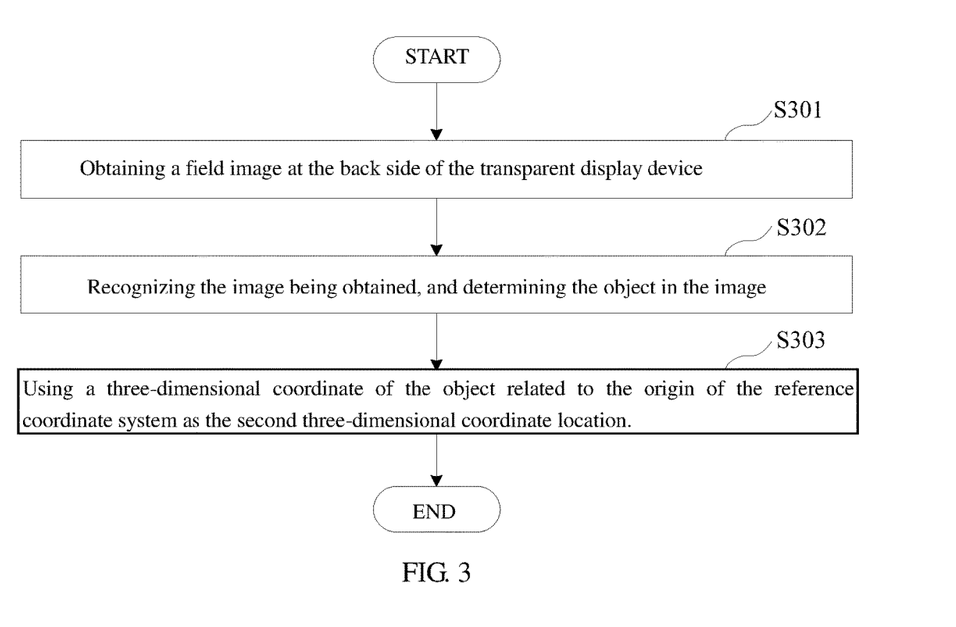
FIG. 3 is a flowchart of determining a second three-dimensional coordinate location of the object according to an exemplary embodiment of the present invention.

FIG. 3 shows a flowchart the step of determining a second three-dimensional coordinate location of the object according to an exemplary embodiment of the present invention.

With reference to FIG. 3, in the step S301, obtaining a field image at the back side of the transparent display device through a second camera unit disposed at a second surface of the transparent display device. Here, the first surface and the second surface are two surfaces of the transparent display device that disposed oppositely. That is, the second surface is an opposite side of the first surface, the object faces toward the second surface of the transparent display device, and the first surface of the transparent display device faces toward the user.

In the step S302, recognizing the image being obtained, and determining the object in the image. Here, various methods can be adopted to determine the object in the image. For example, performing an edge detection to the image, and identifying and determining the object in the image based on the features in the edge detection.

In the step S303, determining a three-dimensional coordinate of the object related to the origin of the reference coordinate system, and the three-dimensional coordinate being determined as the second three-dimensional coordinate location.

Here, converting the first three-dimensional coordinate location of the viewpoint of the user and the second three-dimensional coordinate location of the object into a unified three-dimensional coordinate system is required in order to determine a display location of the auxiliary information of the object on the transparent display device.

It should be understood that the reference coordinate system for determining t the second three-dimensional coordinate location of the object and the reference coordinate system for determining the first three-dimensional coordinate location of the viewpoint of the user can be the same or be different. Preferably, the present invention can use a same reference coordinate system to calculate the second three-dimensional coordinate location of the object and the first three-dimensional coordinate location of the viewpoint of the user. For example, both using a preset position on the transparent display device as the origin of the reference coordinate system.

Figure 4:
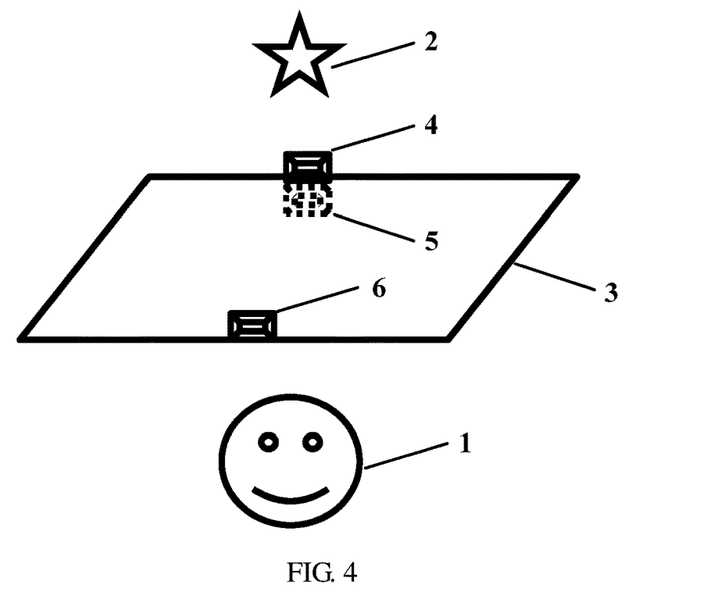
FIG. 4 is a schematic diagram the position of each unit on the transparent display device of the augmented reality display device in FIG. 2 according to an embodiment of the present invention.

The following content will combine FIG. 4 to illustrate determination method of the locations of the first camera unit, the second camera unit and an environment light sensing unit for sensing an environment light on the transparent display device and the origin of the reference coordinate system.

FIG. 4 shows the position of each unit on the transparent display device according to an embodiment of the present invention.

As shown in FIG. 4, the first camera unit 5 is disposed at a first surface (that is, a side of the transparent display device closed to the user) of the transparent display device 3 in order to obtain a face image of the user 1. The second camera unit 4 is disposed at a second surface (that is, a side of the transparent display device away from the user) of the transparent display device 3 in order to obtain an image including the object 2. The environment light sensing unit 6 can be disposed on the transparent display device 3 or be disposed at a location adjacent to the transparent display device 3.

Preferably, the position of the first camera unit 5 on the first surface of the transparent display device 3 is opposite to the position of the second camera unit 4 on the second surface of the transparent display device 3. That is, on a plane where the transparent display device 3 is located, a coordinate location of the position of the first camera unit 5 on the first surface of the transparent display device 3 is the same as a coordinate location of the position of the second camera unit 4 on the second surface of the transparent display device 3.

In this situation, the present position (that is, the origin of the reference coordinate system) can be the position of the first camera unit 5 on the first surface or the position of the second camera unit 4 on the second surface. By this way, the first three-dimensional coordinate location of the viewpoint of the user and the second three-dimensional coordinate location of the of the object are based on the origin of the same reference coordinate system in order to effectively reduce the calculation amount.

Returning to FIG. 1, in the step S40, determining a position of the object on a viewing region of the transparent display device according to the first three-dimensional coordinate location and the second three-dimensional coordinate location. Here, the viewing region can be a region that the user views the object at the viewpoint of the user through the transparent display device. That is, a region of the screen of the transparent display device that is occupied by the object when the user views the object through the transparent display device. At this time, the object is not shown on the display device. However, the present invention is not limited. The image of the object can be displayed at the viewing region.

Preferably, the augmented reality display method according to an exemplary embodiment of the present invention can also comprises: performing an edge detection to the field image at the back side of the transparent display device being obtained, and recognizes an edge of the object. At this time, the second three-dimensional coordinate location of the object can include three-dimensional coordinates of all points on the edge of the object related to the origin of the reference coordinate system. The following will refer to FIG. 5 to illustrate the process of determining the position of the object on the viewing region of the transparent display device.

Figure 5:
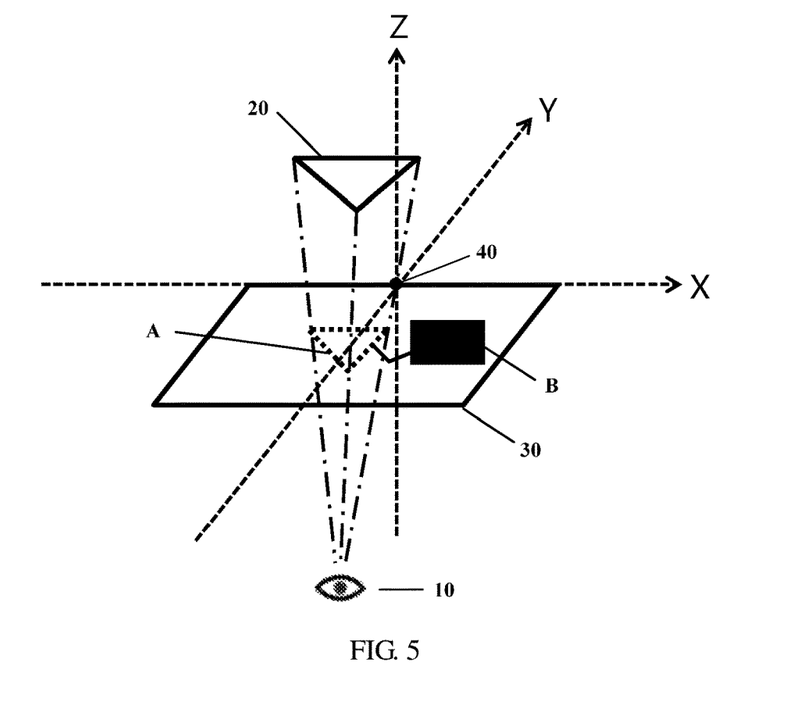
FIG. 5 is a schematic diagram of the process of determining the position of the object on the viewing region of the transparent display device.

FIG. 5 shows a schematic diagram of determining the position of the object on the viewing region of the transparent display device according to an exemplary embodiment of the present invention.

As shown in FIG. 5, in the present embodiment, the position of the first camera unit (or the second camera unit) on the transparent display device 30 is set as the origin 40 of the reference coordinate system, and using the plane where the transparent display device 30 is located as a reference plane.

The process of determining the position of the object on the viewing region of the transparent display device is: line connecting the first three-dimensional coordinate location of the viewpoint of the user 10 and the three-dimensional coordinates of all points on the edge of the object 20 to form multiple lines, using a region "A" on the transparent display device formed by all intersection points of the multiple lines and the reference plane as the position of the object on the viewing region in order to determine a displaying position of the auxiliary information "B" of the object 20 on the transparent display device 30 according to the position of the object on the viewing region.

Returning to FIG. 1, in the step S50, determining a displaying position of the auxiliary information of the object on the transparent display device according to the position of the object on the viewing region.

Preferably, the present invention can determine a relationship between a displaying position of the auxiliary information of the object on the transparent display device and the position of the object on the viewing region of the transparent display device (the two position can be independent or overlapped) according to the type of the auxiliary information of the object.

For example, determining a type of the auxiliary information of the object, according to the type of the auxiliary information of the object, displaying the auxiliary information of the object at a peripheral of the position of the object on the viewing region. That is, the auxiliary information being displayed will not block the user to view the object through the transparent display device. Or, the displaying position of the auxiliary information of the object is overlapped with the position of the object on the viewing region. That is, displaying the auxiliary information of the object at the position of the object on the viewing region.

In the step S60, controlling the transparent display device to display the auxiliary information of the object on the displaying position. Preferably, except displaying the auxiliary information of the object on the displaying location, the instrument information of the transportation or the warning information for prompting the user can also be displayed.

It can be understood that the augmented reality display method of the embodiment of the present invention not only can determine the displaying position of the auxiliary information of the object on the transparent display device, but also can regulate the display brightness of the auxiliary information.

Preferably, the augmented reality display method according to the embodiment of the present invention further include: sensing an environment brightness value of an external environment, when the environment brightness value of the external environment is greater, a display brightness of the auxiliary information is higher. When the environment brightness value of the external environment is less, a display brightness of the auxiliary information is lower in order to avoid that in a brighter environment, the display brightness of the auxiliary information is too low such that the user cannot view the auxiliary information clearly. Or, in a darker environment, the display brightness of the auxiliary information is too high to disturb the sight of the user.

For example, a relationship between multiple environment brightness values and multiple display brightness values. After sensing the environment brightness values of the external environment, according to the relationship between multiple environment brightness values and multiple display brightness values, determining the display brightness value corresponding to the environment brightness values being sensed in order to regulate the display brightness of the auxiliary information of the object to the display brightness being determined.

Figure 6:
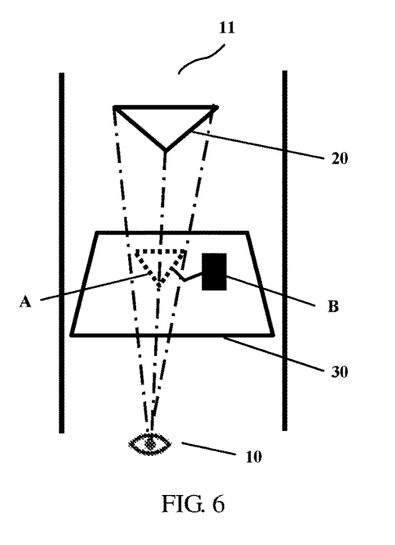
FIG. 6 is a schematic diagram of the change of the position of the object at the viewing region on the transparent display device along with the movement of the object.
Figure 7:
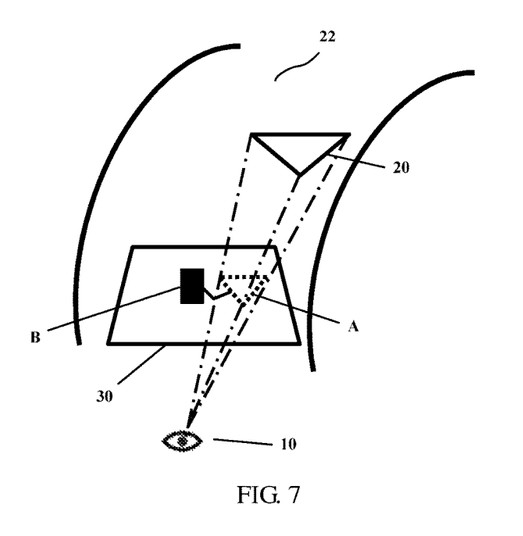
FIG. 7 is a schematic diagram of the change of the position of the object at the viewing region on the transparent display device along with the movement of the object.

FIG. 6 and FIG. 7 show schematic diagrams of the change of the position of the object at the viewing region on the transparent display device along with the movement of the user/object.

FIG. 6 and FIG. 7 show an application example of the augmented reality display method of the present invention. A car transparent display system having an intelligent display function. In the present example, the user can be a car driver, the object can a road, pedestrians, bicycles, puppies or a car except the car driven by the user. According to a road image being taken (that is, a field image at the back side of the transparent display device) and the position of the driver (that is, the viewpoint of the user 10), determining a best region for the driver to the road information (that is, a viewing region "A" of the object on the transparent display device 30) in order to display the auxiliary information "B" of the object and/or the instrument information of the transportation or the warning information (such as speed limit reminder) outside the best viewing region.

FIG. 6 shows the car driven by the user is traveling at a straight road. At this time, the external environment is a bright environment. In this situation, the display brightness value of the auxiliary information of the object displayed on the transparent display device 30 can be increased. FIG. 7 shows the car driven by the user is traveling at a turned road, the external environment is a dark environment. The position of the object 20 related to the transparent display device 30 will change. Correspondingly, the position of the viewing region "A" of the object 20 on the transparent display device will change as well. At this time, the position of the auxiliary information "B" of the object on the transparent display device 30 is regulated correspondingly, and decreasing the display brightness value of the auxiliary information of the object.

By this way, when the position of the user and the position of the object are changed, the display position of the auxiliary information will regulated correspondingly in order to improve the display effect of the augmented reality system. Besides, the display brightness of the auxiliary information of the object can be regulated according to the environment brightness so as to avoid the auxiliary information to block the sight of the driver in order to improve the car display experience. Accordingly, improving the display effect of the augmented reality in order to avoid an interference and a display overlapping to the safety of the driver, increase the intelligent level of the driving display system.

Figure 8:
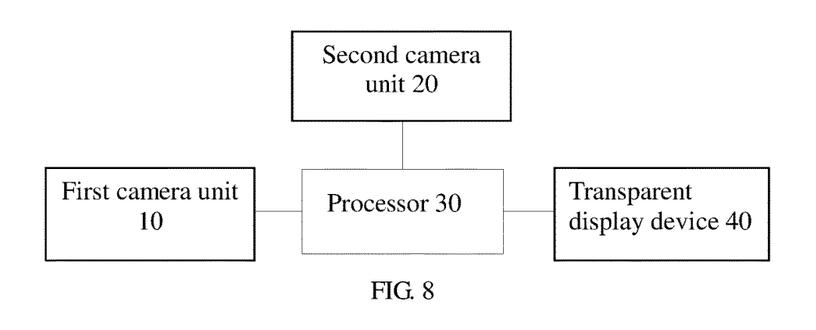
FIG. 8 is a structural diagram of an augmented reality display device according to an embodiment of the present invention.

FIG. 8 shows a structural diagram of an augmented reality display device according to an embodiment of the present invention. As shown in FIG. 8, the augmented reality display device according to an embodiment of the present invention includes a first camera unit 10, a second camera unit 20, a processor 30 and a transparent display device 40. The augmented reality display method according to the transparent display device is executed in the processor 30.

Specifically, the transparent display device 40 is disposed between a user and an object, and the transparent display device 40 can be various conventional devices that can realize a transparent display function.

The first camera unit 10 is used for obtaining a face image of the user, and sending the face image of the user to the processor 30.

The second camera unit 20 is used for obtaining a field image at a back side of the transparent display device, and sending the field image to the processor 30.

The processor 30 is used for processing face image and the field image at the back side of the transparent display device being received in order to determine a displaying position of the auxiliary information of the object on the transparent display device.

The processor 30 determines a viewpoint of the user based on the face image, and determines a first three-dimensional coordinate location of the viewpoint of the user related to the transparent display device 40.

For example, the step of determining a first three-dimensional coordinate location of a viewpoint of a user related to a transparent display device comprises: recognizing the face image being obtained by the first camera unit to determine a position of a human eye in the face image, determining the viewpoint of the user based on the position of the human eye in the face image, and using a preset position on the transparent display device as an origin of a reference coordinate system, determining a three-dimensional coordinate of the viewpoint of the user related to the origin of the reference coordinate system, and using the three-dimensional coordinate being determined as the first three-dimensional coordinate location.

The processor 30 determining the object in the field image based on the field image being obtained, obtaining the auxiliary information of the object, and determining a second three-dimensional coordinate location of the object related to the transparent display device 40.

The step of recognizing the object in a field at the back side of the transparent display device comprises: recognizing the field image being obtained, and determining the object in the field image; wherein the step of determining a second three-dimensional coordinate location of the object related to the transparent display device comprise a step of determining a three-dimensional coordinate of the object related to the origin of the reference coordinate system, and the three-dimensional coordinate being determined as the second three-dimensional coordinate location.

The first camera unit 10 is disposed on a first surface of the transparent display device 40, the second camera unit 20 is disposed on a second surface of the transparent display device 40, and the first surface and the second surface are two opposite surfaces of the transparent display device 40.

Preferably, a position of the first camera unit 10 on the first surface of the transparent display device 40 is opposite to a position of the second camera unit 20 on the second surface of the transparent display device 40. In this situation, the present position functioned as the origin of the reference coordinate is the position of the first camera unit 10 on the first surface or the position of the second camera unit 20 on the second surface.

The processor 30 also determines a position of the object on a viewing region of the transparent display device 40 according to the first three-dimensional coordinate location and the second three-dimensional coordinate location, determines a displaying position of the auxiliary information of the object on the transparent display device 40 according to the position of the object on the viewing region, and controls the transparent display device 40 to display the auxiliary information of the object at the displaying position.

Specifically, the processor 30 performs an edge detection to the field image, recognizing an edge of the object, wherein the second three-dimensional coordinate location of the object includes three-dimensional coordinates of all points on the edge of the object related to the origin. In this situation, the step of determining a position of the object on a viewing region of the transparent display device according to the first three-dimensional coordinate location and the second three-dimensional coordinate location comprises: using a plane where the transparent display device is located as a reference plane, line connecting the first three-dimensional coordinate location of the viewpoint of the user and the three-dimensional coordinates of all points on the edge of the object to form multiple lines, and using a region on the transparent display device formed by all intersection points of the multiple lines and the reference plane as the position of the object on the viewing region.

The processor 30 also determines a type of the auxiliary information of the object, controls the transparent display device 40 to display the auxiliary information of the object at a peripheral of the position of the object on the viewing region according to the type of the auxiliary information of the object, or controls the transparent display device 40 to display the auxiliary information of the object to be overlapped with the position of the object on the viewing region.

Preferably, the augmented reality display device further comprises: an environment light sensing unit for sensing an environment brightness value of an external environment; and when the environment brightness value of the external environment is greater, a display brightness of the auxiliary information is higher; when the environment brightness value of the external environment is less, the display brightness of the auxiliary information is lower.

For example, a relationship between multiple environment brightness values and multiple display brightness values can be preset. The processor determines the display brightness value corresponding to the environment brightness values being sensed according to the preset relationship between multiple environment brightness values and multiple display brightness values, and regulates the display brightness of the auxiliary information of the object to the display brightness being determined.

The embodiment of the present invention also provides a computer readable storage media. The computer readable storage media make the processor to execute the program instructions of the augmented reality display method based on the transparent display device as described above the processor is operated. The computer readable storage media can be any data storage device that store the data read by the computer system. The computer readable storage media includes read only memory, random access memory, read only optical disk, magnetic tape, floppy disk, optical data storage device, and carrier wave (such as a data transmission of a transmission path of wire or wireless through internet). The computer readable storage media can be a computer system that distributed in a connected network in order to store and execute computer readable codes in a distributed way. Besides, the function process, codes and code segments for finishing the present invention can be easily explained by the ordinary programmer in the related field of the present invention.

The augmented reality display method and the augmented reality display device of the present invention can determine the auxiliary information on the transparent display device based on the position of the viewpoint of the user and the displaying position of the object on the transparent display device in order to avoid the technology problem that a vision of a user is easily to be blocked when displaying an auxiliary information of the object on the conventional transparent display device.

Besides, the augmented reality display method and the augmented reality display device of the present invention can regulate the display brightness of the auxiliary information of the object according to the change of the environment brightness in order to provide a better experience for the user.

Besides, the augmented reality display method based on the transparent display device of the embodiment of the present invention can be realized as computer codes in the computer readable storage media. The person skilled in the art can realize the computer codes according to the method described above. When the computer codes are executed in the computer, the method of the present invention is realized.

The above embodiments of the present invention are only exemplary, however, the present invention is not limited. The person skilled in the art can understand: without exceeding the principle and spirit of the present invention, the above embodiments can be changed in form and detail.

What is claimed is:

1. An augmented reality display method based on a transparent display device, the transparent display device is disposed between a user and an object, and the augmented reality display method comprises:

determining a first three-dimensional coordinate location of a viewpoint of a user related to a transparent display device;

recognizing the object in a field at the back side of the transparent display device, and obtaining an auxiliary information of the object;

determining a second three-dimensional coordinate location of the object related to the transparent display device;

determining a position of the object on a viewing region of the transparent display device according to the first three-dimensional coordinate location and the second three-dimensional coordinate location; wherein the viewing region is a region that viewing the object at the viewpoint of the user through the transparent display device;

determining a displaying position of the auxiliary information of the object on the transparent display device according to the position of the object on the viewing region; and controlling the transparent display device to display the auxiliary information of the object at the displaying position;

wherein the step of determining a first three-dimensional coordinate location of a viewpoint of a user related to a transparent display device comprises:

obtaining a face image of the user through a first camera unit disposed on a first surface of the transparent;

recognizing the face image being obtained to determine a position of a human eye in the face image;

determining the viewpoint of the user based on the position of the human eye in the face image; and using a preset position on the transparent display device as an origin of a reference coordinate system, determining a three-dimensional coordinate of the viewpoint of the user related to the origin of the reference coordinate system, and using the three-dimensional coordinate being determined as the first three-dimensional coordinate location;

wherein the step of recognizing the object in a field at the back side of the transparent display device comprises:

obtaining a field image at the back side of the transparent display device through a second camera unit disposed at a second surface of the transparent display device, wherein the first surface and the second surface are two surfaces of the transparent display device that disposed oppositely;

recognizing the field image being obtained, and determining the object in the field image;

wherein the step of determining a second three-dimensional coordinate location of the object related to the transparent display device comprise a step of determining a three-dimensional coordinate of the object related to the origin of the reference coordinate system, and the three-dimensional coordinate being determined as the second three-dimensional coordinate location; and wherein the method further comprises: performing an edge detection to the field image at the back side of the transparent display device being obtained, and recognizes an edge of the object, wherein the second three-dimensional coordinate location of the object includes three-dimensional coordinates of all points on the edge of the object related to the origin; and wherein the step of determining a position of the object on a viewing region of the transparent display device according to the first three-dimensional coordinate location and the second three-dimensional coordinate location comprises:

using a plane where the transparent display device is located as a reference plane, line connecting the first three-dimensional coordinate location of the viewpoint of the user and the three-dimensional coordinates of all points on the edge of the object to form multiple lines, and using a region on the transparent display device formed by all intersection points of the multiple lines and the reference plane as the position of the object on the viewing region.

2. The augmented reality display method according to claim 1, wherein the position of the first camera unit on the first surface of the transparent display device is opposite to the position of the second camera unit on the second surface of the transparent display device, and the present position is the position of the first camera unit on the first surface or the position of the second camera unit on the second surface.

3. The augmented reality display method according to claim 1, wherein the step of determining a displaying position of the auxiliary information of the object on the transparent display device according to the position of the object on the viewing region comprises:

determining a type of the auxiliary information of the object; and according to the type of the auxiliary information of the object, displaying the auxiliary information of the object at a peripheral of the position of the object on the viewing region or displaying the auxiliary information of the object to be overlapped with the position of the object on the viewing region.

4. The augmented reality display method according to claim 1, wherein the method further comprises steps of:

sensing an environment brightness value of an external environment; and when the environment brightness value of the external environment is greater, a display brightness of the auxiliary information is higher.

5. The augmented reality display method according to claim 1, wherein the method further comprises steps of:

sensing an environment brightness value of an external environment;

determining the display brightness value corresponding to the environment brightness values being sensed according to a preset relationship between multiple environment brightness values and multiple display brightness values; and regulating the display brightness of the auxiliary information of the object to the display brightness being determined.

6. An augmented reality display device, comprising:

a transparent display device disposed between an user and an object;

a first camera unit for obtaining a face image of the user;

a second camera unit for obtaining a field image at a back side of the transparent display device;

a processor being configured to perform step of:

determining a viewpoint of the user based on the face image, and determining a first three-dimensional coordinate location of the viewpoint of the user related to the transparent display device;

determining the object in the field image based on the field image being obtained, obtaining the auxiliary information of the object, and determining a second three-dimensional coordinate location of the object related to the transparent display device;

determining a position of the object on a viewing region of the transparent display device according to the first three-dimensional coordinate location and the second three-dimensional coordinate location;

determining a displaying position of the auxiliary information of the object on the transparent display device according to the position of the object on the viewing region, and controlling the transparent display device to display the auxiliary information of the object at the displaying position;

wherein the step of recognizing the object in a field at the back side of the transparent display device comprises:

recognizing the field image being obtained, and determining the object in the field image;

wherein the step of determining a second three-dimensional coordinate location of the object related to the transparent display device comprise a step of determining a three-dimensional coordinate of the object related to the origin of the reference coordinate system, and the three-dimensional coordinate being determined as the second three-dimensional coordinate location;

wherein the step of determining a first three-dimensional coordinate location of a viewpoint of a user related to a transparent display device comprises: recognizing the face image being obtained by the first camera unit to determine a position of a human eye in the face image, determining the viewpoint of the user based on the position of the human eye in the face image, and using a preset position on the transparent display device as an origin of a reference coordinate system, determining a three-dimensional coordinate of the viewpoint of the user related to the origin of the reference coordinate system, and using the three-dimensional coordinate being determined as the first three-dimensional coordinate location; and wherein the processor performs an edge detection to the field image, recognizing an edge of the object, wherein the second three-dimensional coordinate location of the object includes three-dimensional coordinates of all points on the edge of the object related to the origin;

wherein the step of determining a position of the object on a viewing region of the transparent display device according to the first three-dimensional coordinate location and the second three-dimensional coordinate location comprises:

using a plane where the transparent display device is located as a reference plane, line connecting the first three-dimensional coordinate location of the viewpoint of the user and the three-dimensional coordinates of all points on the edge of the object to form multiple lines, and using a region on the transparent display device formed by all intersection points of the multiple lines and the reference plane as the position of the object on the viewing region.

7. The augmented reality display device according to claim 6, wherein the first camera unit is disposed on a first surface of the transparent display device, the second camera unit is disposed on a second surface of the transparent display device, and the first surface and the second surface are two opposite surfaces of the transparent display device; and a position of the first camera unit on the first surface of the transparent display device is opposite to a position of the second camera unit on the second surface of the transparent display device, and the present position is the position of the first camera unit on the first surface or the position of the second camera unit on the second surface.

8. The augmented reality display device according to claim 6, wherein the step of determining a displaying position of the auxiliary information of the object on the transparent display device according to the position of the object on the viewing region comprises:

determining a type of the auxiliary information of the object; and according to the type of the auxiliary information of the object, displaying the auxiliary information of the object at a peripheral of the position of the object on the viewing region or displaying the auxiliary information of the object to be overlapped with the position of the object on the viewing region.

9. The augmented reality display device according to claim 6, wherein the augmented reality display device further comprises: an environment light sensing unit for sensing an environment brightness value of an external environment; and when the environment brightness value of the external environment is greater, a display brightness of the auxiliary information is higher.

10. The augmented reality display device according to claim 6, wherein the augmented reality display device further comprises: an environment light sensing unit for sensing an environment brightness value of an external environment;

wherein the processor determines the display brightness value corresponding to the environment brightness values being sensed according to a preset relationship between multiple environment brightness values and multiple display brightness values, and regulates the display brightness of the auxiliary information of the object to the display brightness being determined.

* * * * *